US010988677B2

United States Patent
Montalvo et al.

(10) Patent No.: US 10,988,677 B2
(45) Date of Patent: Apr. 27, 2021

(54) MICRO-AGGREGATES AND MICROPARTICULATES FOR USE IN SUBTERRANEAN FORMATION OPERATIONS

(71) Applicant: Halliburton Energy Services, Inc., Houston, TX (US)

(72) Inventors: Janette Cortez Montalvo, Porter, TX (US); Philip D. Nguyen, Houston, TX (US); Loan K. Vo, Houston, TX (US); Travis Hope Larsen, Houston, TX (US); Dipti Singh, Kingwood, TX (US); Ronald Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 131 days.

(21) Appl. No.: 16/304,100

(22) PCT Filed: Jun. 22, 2016

(86) PCT No.: PCT/US2016/038720
§ 371 (c)(1),
(2) Date: Nov. 21, 2018

(87) PCT Pub. No.: WO2017/222519
PCT Pub. Date: Dec. 28, 2017

(65) Prior Publication Data
US 2020/0224084 A1    Jul. 16, 2020

(51) Int. Cl.
*C09K 8/70* (2006.01)
*C09K 8/68* (2006.01)
(Continued)

(52) U.S. Cl.
CPC ............. *C09K 8/70* (2013.01); *C09K 8/68* (2013.01); *C09K 8/80* (2013.01); *E21B 43/267* (2013.01)

(58) Field of Classification Search
CPC ........ C09K 8/68; C09K 8/80; C09K 2208/28; C09K 8/685; C09K 8/882; E21B 43/267; E21B 43/26; E21B 43/283
See application file for complete search history.

(56) References Cited

U.S. PATENT DOCUMENTS 4,964,466 A    10/1990   Williams et al.
5,095,987 A     3/1992   Weaver et al.
(Continued)

FOREIGN PATENT DOCUMENTS

CN    104310628 A  *  1/2015
WO    2014189698 A1    11/2014
(Continued)

OTHER PUBLICATIONS

Kurenkov et al., Application of Polyacrylamide Flocculants for Water Treatment, Thermatic Division: Chemical Technology (Dec. 15, 2002).
(Continued)

*Primary Examiner* — Zakiya W Bates
(74) *Attorney, Agent, or Firm* — McGuireWoods LLP

(57) ABSTRACT

Methods and systems employing a flocculation polymer and microparticulates. The flocculation polymer flocculates the microparticulates to form micro-aggregates for use in forming complex fracture networks. Additionally, the flocculation causes the flocculation polymer to be removed from a treatment fluid due to its interaction with the microparticulates, thereby effectively cleaning the flocculation polymer from a subterranean formation. Individual microparticulates
(Continued)

are synergistically used alone or in the presence of a de-aggregating agent to enhance complex fracture networks.

20 Claims, 3 Drawing Sheets

(51) Int. Cl.
    *C09K 8/80*     (2006.01)
    *E21B 43/267*     (2006.01)
    *E21B 43/22*     (2006.01)

(56) References Cited

U.S. PATENT DOCUMENTS

| | | |
|---|---|---|
| 5,799,734 A | 9/1998 | Norman et al. |
| 6,935,426 B1 | 8/2005 | Rainbolt et al. |
| 7,897,063 B1 | 3/2011 | Perry et al. |
| 8,616,284 B2 | 12/2013 | Crews et al. |
| 2011/0120712 A1 | 5/2011 | Todd et al. |
| 2013/0025867 A1 | 1/2013 | Sun et al. |
| 2013/0161003 A1 | 6/2013 | Makarychev-Mikhailov et al. |
| 2013/0312962 A1 | 11/2013 | Weaver |
| 2014/0000890 A1 | 1/2014 | Sun et al. |
| 2014/0000897 A1 | 1/2014 | Wang et al. |
| 2014/0262264 A1 | 9/2014 | Potapenko et al. |

FOREIGN PATENT DOCUMENTS

| | | |
|---|---|---|
| WO | 2015076693 A1 | 5/2015 |
| WO | 2015102580 A1 | 7/2015 |

OTHER PUBLICATIONS

Cipolla et al., The Relationship Between Fracture Complexity, Reservoir Properties, and Fracture Treatment Design, 2008 SPE Annual Technical Conference and Exhibition held in Denver, CO, 2008, SPE 115769.

International Search Report and Written Opinion dated Mar. 20, 2017; International PCT Application No. PCT/US2016/038720.

\* cited by examiner ular subterranean formation location, increasing pressure within a formation may be achieved by placing fluid therein at a high flow rate to increase the pressure on the formation. Placing a fluid at a rate or pressure that is below the threshold to create or enhance at least one fracture is known as placing the fluid into the formation at "matrix flow rate."

MICRO-AGGREGATES AND MICROPARTICULATES FOR USE IN SUBTERRANEAN FORMATION OPERATIONS

BACKGROUND

The embodiments herein relate generally to subterranean formation operations and, more particularly, to micro-aggregates and microparticulates for use in subterranean formation operations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any particular component thereof. By way of non-limiting example, a "treatment fluid" may be an acidizing fluid, a fracture-initiating fluid, a proppant-laden fluid, etc. As used herein, the term "fracture gradient" refers to a pressure necessary to create or enhance at least one fracture in a particular subterranean formation location, increasing pressure within a formation may be achieved by placing fluid therein at a high flow rate to increase the pressure on the formation. Placing a fluid at a rate or pressure that is below the threshold to create or enhance at least one fracture is known as placing the fluid into the formation at "matrix flow rate."

To achieve pressures above the fracture gradient, the treatment fluid is generally introduced at high pressures and/or high flow rates, which can cause turbulent flow of the treatment fluid. Such turbulent flow can result in friction pressure between the treatment fluid and subterranean formation equipment (e.g., wellbore piping, wellbore casing, and the like), as well as between the treatment fluid and the formation itself. Such friction pressure increases the energy necessary to pump the treatment fluid into the subterranean formation (e.g., the wellbore). Accordingly, friction reducing agents may be added to the treatment fluids to change the rheological properties of the treatment fluid to overcome or minimize the friction pressure.

Additionally, during stimulation operations, particulate solids are typically suspended in a portion of the treatment fluid and then deposited into the fractures, also increasing friction pressures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

Stimulation operations may be further enhanced by increasing the complexity of a fracture network (or "network complexity"). As used herein, the term "fracture network" refers to the access conduits, either natural or man-made, within a subterranean formation that are in fluid communication with a wellbore. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
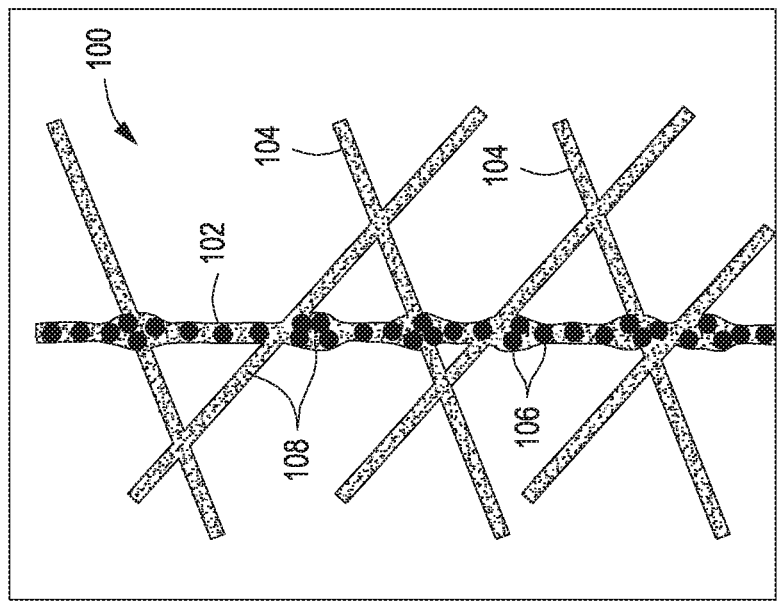
FIGS. 1A and 1B are cross-sectional side views of a complex fracture network illustrating propped with micro-aggregates and individual microparticulates, according to one or more embodiments of the present disclosure.

The embodiments herein relate generally to subterranean formation operations and, more particularly, to micro-aggregates and microparticulates for use in subterranean formation operations.

The embodiments of the present disclosure operate to form on-the-fly micro-aggregates for propping fractures in a complex network, and may additionally synergistically operate to provide friction reduction to reduce friction pressures of treatment fluids on subterranean formation equipment and the wellbore itself. Because the micro-aggregates are formed on-the-fly, the formation of the micro-aggregates results in a "clean" formation with little or no residue associated with causing formation damage, which is typical with the use of traditional friction reducing agents. That is, the flocculation polymers described herein are able to flocculate microparticulates, which thus sequesters the flocculation polymers and reduces or eliminates contact of the flocculation polymers with the surfaces within the formation (e.g., reducing any coating on the formation).

The embodiments of the present disclosure accordingly are at least dual-purpose and can be used in any subterranean formations, including low and ultra-low permeability formations. Further, the configuration of a wellbore in a subterranean formation for use in the embodiments described herein is non-limiting, and thus the wellbore may be vertical, horizontal, or deviated (neither vertical, nor horizontal), without departing from the scope of the present disclosure.

The present disclosure may enhance production of subterranean formation wellbores by keeping one or more induced or natural branch fractures open and connected with one or more dominate fractures (or secondary branch fractures) to allow produced fluids to flow. The branch and/or dominate fractures exhibit high conductivity by being propped with micro-aggregates that form at least a partial monolayer therein, where proppant-free channels may be formed between the individual micro-aggregates. Additionally, individual microparticulates can be placed between the micro-aggregates to increase the resistivity to fracture closure and/or individual microparticulates can be introduced through the space between the micro-aggregates to reach far-field regions of the branch fractures to further enhance conductivity. Because of the presence of the micro-aggregates in the branch fracture, the individual microparticulates may be able to reach farther far-field distances as compared to without the presence of the micro-aggregates.

Some embodiments described herein accordingly may relate to complex fracture networks that include dominate fractures and branch fractures (including secondary, tertiary, etc. branch fractures). As used herein, the term "dominate fracture," and grammatical variants thereof, refers to a primary fracture extending from a wellbore. A "branch fracture," and grammatical variants thereof, as used herein, refers to any non-dominate fracture. Branch fractures extend from a dominate fracture or extend from any non-dominate fracture (e.g., another branch fracture, a secondary branch fracture, a tertiary branch fracture, and the like) extending from a dominate fracture, and have a flow channel width or flow opening size less than that of the dominate fracture or non-dominate fracture from which it extends. Typically, the flow channel width of a branch fracture of the present disclosure is in the range of from about 0.01 millimeters (mm) to about 0.2 mm, encompassing any value and subset therebetween. The branch fractures create a fluid path and may be in the form of cracks, slots, conduits, perforations, holes, or any other ablation within the formation. As used herein, the term "fracture" refers collectively to dominate fractures and branch fractures, unless otherwise specified.

The embodiments described herein advantageously naturally form micro-aggregates within the treatment fluids, meaning that they do not have to be pre-formed or otherwise created. Instead, the contents of the treatment fluid, including microparticulates naturally result in the formation of the micro-aggregates described herein. Once formed, the micro-aggregates, alone or in combination with additional individual microparticulates form part of a complex fracture network that maximizes hydrocarbon production therefrom. Moreover, the treatment fluids described herein may additionally impart friction reduction to the formation while forming the complex fracture network, depending on the selected flocculation polymer, for example.

In some embodiments, the complex fracture network formation and production methods and systems described herein may be used in traditional subterranean formations or in low-permeability subterranean formations, such as shale formations, tight-gas formations (e.g., tight-gas sandstone formations), and the like (collectively referred to simply as "subterranean formations" or "formations"). The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy).

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

A treatment fluid formed according to one or all of the embodiments described herein includes a polar base fluid, a flocculation polymer and microparticulates. The flocculation polymer may comprise a chitosan, an ionically charged polymer (natural and/or synthetic), a polyacrylamide-polyacrylate copolymer, or combinations thereof. The presence of the flocculation polymer in the treatment fluid flocculates the microparticulates to form the micro-aggregates described herein. The formation of the micro-aggregates may be due to charge-charge interaction between the flocculation polymer and the microparticulates, causing complexation of the friction reducing polymer and the microparticulates. Accordingly, in some embodiments, it is preferred that the selected flocculation polymer is chosen to have an opposite charge to that of the microparticulates to facilitate flocculation and micro-aggregate formation. In some embodiments, the flocculation polymer is selected to additionally act as a friction reducing agent, and consists essentially of one or more polyacrylamide-polyacrylate copolymers. In other embodiments, the flocculation polymer comprises a polyacrylamide-polyacrylate copolymer alone or in combination with a chitosan and/or an ionically charged polymer.

As described above, the embodiments described herein are able to provide a nonconventional mechanism for removing the flocculation polymer from solution (such as a treatment fluid), which may be referred to as "cleaning" the flocculation polymer, to reduce residue that causes formation damage, particularly in unconventional formations and small fractures, such as the branch fractures described herein. The flocculation polymers of the present disclosure may be difficult to break and remove from a fracture or fracture network within a formation because they have a very stable carbon-carbon backbone. Thus, after their introduction into a fracture or fracture network in the formation, the flocculation polymers described herein may leave residue on the formation face and/or various proppant packs, thereby reducing conductivity of the fracture or fracture network in the formation. A strong oxidizing breaker may be used to break the carbon-carbon backbone, although unbroken flocculation polymer may still remain in the fracture or fracture network in the formation, which may concentrate in the near wellbore region, again hindering conductivity. Such strong oxidizing breakers may also require high bottom-hole temperatures to achieve breakdown of the flocculation polymers, and thus such breakers may be less effective in formations having low temperatures (e.g., midcontinent basins having temperatures of less than about 200° F.). Additionally, formation fluids (e.g., water) with high total dissolved solids (TDS), the flocculation polymers may react with ions therein inhibiting the effectiveness of the breaker due to ionic interaction between the partially broken flocculation polymers and the ions. That is, the interaction between the flocculation polymer(s) and the ions may create "jelly balls" or globs of the polymer that can flow back during well production, which can plug pore throats of a formation and reduce overall effective permeability or can accumulate in the fracture or fracture network and damage the flow potential thereof.

As an alternative, nonconventional mechanism of cleaning the flocculation polymer, the formation of the micro-aggregates described herein is used to reduce contact and residue from the flocculation polymer on the formation and/or various proppant packs. That is, the flocculation polymer flocculates the microparticulates to form the micro-aggregates, where the flocculation polymer essentially wraps around the microparticulates and thus are sequestered from the polar base fluid in the treatment fluid (i.e., they come out of solution). These micro-aggregates then act as a propping agent.

The treatment fluid comprising the flocculation polymer and the microparticulates may be introduced into a subterranean formation (e.g., a wellbore), where the microparticulates are flocculated with the flocculation polymer to form the micro-aggregates. The flocculation polymer and/or microparticulates may be included in the treatment fluid prior to introducing the treatment fluid into the formation (e.g., pre-formed), where some or all of the flocculation may occur prior to the treatment fluid being introduced into the. Alternatively, one or both of the flocculation polymer and/or the microparticulates may be introduced into the treatment fluid as it is being introduced into a subterranean formation (e.g., "on-the-fly") such that the flocculation to form the micro-aggregates takes place in the subterranean formation. The micro-aggregates may be placed into one or more fractures in the formation, including a dominate fracture, a branch fracture, and any combination thereof.

In some instances, the micro-aggregates placed within at least one fracture forms at least a partial monolayer therein. That is, the micro-aggregates may form a partial monolayer or a partial multilayer (a partial multilayer being greater than the "at least" partial monolayer) in the at least one fracture, without departing from the scope of the present disclosure. As defined herein, the term "partial monolayer" refers to a type of proppant pack in which micro-aggregates are capable of holding a fracture open, and the separation between any one point of the fracture faces is less than, or about the same, as the largest exterior dimension of any one of the micro-aggregates. As used herein, the term "partial multilayer" refers to a type of proppant pack in which micro-aggregates are capable of holding a fracture open, and the separation between any one point of the fracture faces is more than the largest exterior dimension of any one of the micro-aggregates. In a partial monolayer and/or partial multilayer, the micro-aggregates may be spaced closely or widely apart. The partial monolayer and/or partial multilayer allow increased flow channels between the micro-aggregates to increase high flow capacity of a propped fracture.

In some embodiments, a second treatment fluid may be introduced into the formation after the initial treatment fluid is introduced into the formation. The second treatment fluid may comprise a polar base fluid and individual microparticulates, where the individual microparticulates are placed into the one or more fractures. Accordingly, both the micro-aggregates and the individual microparticulates exist within the one or more fractures, further enhancing hydrocarbon production therefrom. That is, the individual microparticulates may reach far reaches or small widths of one or more fractures (including both dominate fractures and branch fractures) to prop them open due to leakoff during fracture closure upon hydraulic pressure removal. In certain instances, any residual flocculation polymer from the first treatment fluid may cause the individual microparticulates in the second treatment fluid to flocculate and form micro-aggregates. Alternately, the order of the fluids may be reversed where the initial treatment fluids described above is introduced before the second treatment fluid described above. That is, the order of introducing the various treatment fluids is not limiting, such that the micro-aggregates may be introduced either before or after the individual microparticulates, without departing from the scope of the present disclosure.

In other instances, the second treatment fluid may further comprise a de-aggregating agent to ensure that the individual microparticulates are not flocculated. Accordingly, individual microparticulates are introduced and the effects of the flocculation polymer are not hindered. The presence of the de-aggregating agent may also aid in allowing the individual microparticulates to travel deeper into a fracture (dominate and/or branch fractures).

Any treatment fluid described herein may be used to form one or more of the dominate fracture and/or the branch fractures, without departing from the scope of the present disclosure. Alternatively, one or more treatment fluids having different compositions may be used to form the one or more dominate fracture and/or branch fractures. For example, in one embodiment, a first treatment fluid comprising a first polar base fluid and a first flocculation polymer as described herein is introduced into a formation at a pressure above the fracture gradient to create or enhance at least one dominate fracture. Thereafter, a second treatment fluid comprising a second polar base fluid, a second flocculation polymer as described herein, and first microparticulates is introduced into the formation above the fracture gradient to create or enhance at least one branch fracture extending from the at least one dominate fracture. The first microparticulates are flocculated in the second treatment fluid with one or both of the second flocculation polymer and/or the first flocculation polymer, thereby forming micro-aggregates. The micro-aggregates may then be placed into the at least one branch fracture to form at least a partial monolayer therein. In other embodiments, a treatment fluid having any base fluid and with or without additional additives is introduced into the formation above the fracture gradient to create or enhance the at least one dominate fracture and/or the at least one branch fractures extending therefrom.

In some embodiments, a third treatment fluid may thereafter be introduced into the subterranean formation at a pressure above the fracture gradient, where the third treatment fluid comprises a third polar base fluid, a third flocculation polymer, second microparticulates, and a de-aggregating agent. At least a portion of the second microparticulates remain individual microparticulates and are placed into the at least one branch fracture (and may also settle in the at least one dominate fracture) between the micro-aggregates. Thereafter, if desired, a fourth treatment fluid can be introduced into the subterranean formation at a pressure above the fracture gradient, where the fourth treatment fluid comprises a fourth polar base fluid and proppant particulates sized larger than the microparticulates. The proppant particulates are placed into the at least one dominate fracture where they form a proppant pack therein to prop open the dominate fracture. In some embodiments, the proppant particulates are metered into the fourth treatment fluid as it is introduced into the formation, and the proppant particulates increase in size to match the size of the dominate fracture, where the dominate fracture is larger in the near wellbore region compared to the far field region. For example, the proppant particulates may be 100-mesh, then 40/70-mesh, followed by 30/50-mesh on the U.S. Sieve Series.

Figure 1B:
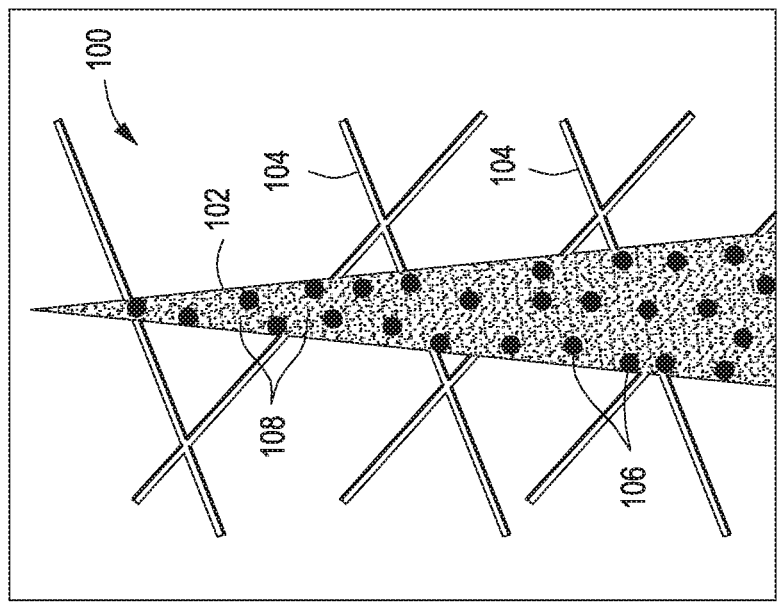

Referring now to FIGS. 1A and 1B, illustrated is the process by which the micro-aggregates and the individual microparticulates can be used synergistically to reach branch fractures by taking advantage of leak off as described above. As shown in FIG. 1A, a fracture network 100 is formed having a dominate fracture 102 and multiple branch fractures 104 extending therefrom. Hydraulic pressure is maintained to keep the fracture network 100 open and micro-aggregates 106 are placed into the dominate fracture along with individual microparticulates 108. Referring now to FIG. 1B, with continued reference to FIG. 1A, shown is the same fracture network 100 after fracture closure due to hydraulic pressure removal. Due to leak off during fracture closure, a portion of the individual microparticulates 108 migrate into the branch fractures 104, thereby enhancing the conductivity of those branch fractures, and the micro-aggregates 106 remain in the dominate fracture 102. Accordingly, the micro-aggregates 106 act to bridge the mouths of the branch fractures 104, allowing delivery of the individual microparticulates 108 into the branch fractures 104, thus enhancing the complex fracture network 100.

Where the flocculation polymer is or comprises a polyacrylamide-polyacrylate copolymer (thus also imparting friction reducing qualities), the terms "polyacrylamide" and "polyacrylate" are used in their ordinary meaning. That is, "polyacrylamide" is a polymer formed of acrylamide monomer subunits and may be either in its linear chain structure form or in its crosslinked form, without departing from the scope of the present disclosure. The polyacrylamide may impart the flocculating properties to the flocculation polymer. The "polyacrylate" is a polymer formed of acrylate monomers (e.g., methacrylate, methyl acrylate, ethyl acrylate, hydroxyethyl methacrylate, butyl acrylate, butyl methacrylate, and the like). The polyacrylate may be an acrylic elastomer, where it imparts elasticity to the flocculation polymer. That is, in some embodiments, the micro-aggregates formed by flocculation with the flocculation polymer may themselves be elastic or deformable, allowing easy access into one or more branch fractures. In some instances, the polyacrylamide-polyacrylate flocculation polymer is formed by hydrolysis of acrylamide, rather than co-polymerizing acrylamide and acrylate.

The ratio of polyacrylamide to polyacrylate forming the flocculation polymer may be in the range of about 5% to about 10% by molar % of polyacrylamide to polyacrylate, encompassing any value and subset therebetween. For example, the ratio of polyacrylamide to polyacrylate forming the flocculation polymer may be in the range of about 5% to about 6%, or 6% to about 7%, or about 7% to about 8%, or about 8% to about 9%, or about 9% to about 10%, or about 6% to about 9%, or about 7% to about 8% by molar % of polyacrylamide to polyacrylate, encompassing any value and subset therebetween. The ratio of polyacrylamide to polyacrylate may depend on a number of factors including, but not limited to, the desired deformability of the formed micro-aggregates, the type of microparticulates selected, the size and shape of the dominate and/or branch fractures, and the like.

Specific examples of the flocculation polymer for use in the embodiments of the present disclosure include, but are not limited to, acrylamide/2-acrylamido-2-methylpropanesulfonic acid/acryloyloxyethyl trimethylammonium chloride copolymer, acrylic acid acrylamide, quat acrylamide, amine/ammonium copolymer, acrylamide/acryloyloxyethyl trimethylammonium chloride copolymer, and any combination thereof.

The amount of flocculation polymer included in one or more of the treatment fluids described herein may be based on the desired amount of friction reduction where applicable, the desired size and shape of formed micro-aggregates, the type of microparticulates selected, and the like, and any combination thereof. In some embodiments, the amount of flocculation polymer included in a treatment fluid described herein (regardless of any other additives included in the treatment fluid), is in the range of about 0.01% to about 0.5% by volume of the polar base fluid, encompassing any value and subset therebetween. For example, the flocculation polymer may be included in an amount of about 0.01% to about 0.1%, or about 0.1% to about 0.2%, or about 0.2% to about 0.3%, or about 0.3% to about 0.4%, or about 0.4% to about 0.5%, or about 0.01% to about 0.4%, or about 0.1% to about 0.3% by volume of the polar base fluid, encompassing any value and subset therebetween.

The microparticulates and proppant particulates of the present disclosure may be composed of the same type of materials, although the microparticulates and the proppant particulates need not be composed of the same material, without departing from the scope of the present disclosure.

Similarly, the shape(s) of the microparticulates and the proppant particulates may be the same or different, without departing from the scope of the present disclosure. Accordingly, in some embodiments, the microparticulates and the proppant particulates differ only in their size, whereas in other embodiments, the microparticulates and proppant particulates may differ in one or more of material composition and/or shape as well as size.

Examples of suitable materials for forming the microparticulates and/or proppant particulates may include, but are not limited to, sand, ceramic materials, glass materials, polymer materials (e.g., polystyrene, polyethylene, etc.), nut shell pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufactured materials, any of the aforementioned mixed with a resin to form cured resinous particulates, and any combination thereof. As used herein, the term "sand" refers to naturally occurring granular material composed of rock and mineral particulates (e.g., desert sand, beach sand). Nut shells may be from any fruit consisting of a hard or tough shell (encompassing seed and pit shells) including, but not limited to, pecan, walnut, pine, hazelnut, chestnut, acorn, brazil, candlenut, coconut, cashew, pistachio, and the like, and any combination thereof. The term "ceramic material" includes any inorganic crystalline material, compounded of a metal and a non-metal. Examples of suitable ceramics for use as the micro-proppant and/or proppant particulates herein include, but are not limited to, silicon carbide, cordierite, porcelain, alumina porcelain, high-voltage porcelain, lithia porcelain, cordierite refractory, alumina silica refractory, magnesium silicate, steatite, forsterite, titania, tatanate, and any combination thereof. Accordingly, the embodiments described herein allow the use of low-cost, often from waste stream sources (e.g., fly ash) for use as proppant materials.

The shape of the microparticulates and/or proppant particulates may be of any shape capable of meeting the desired unit mesh size or unit mesh size range, as described below. For example, the microparticulates and/or proppant particulates may be substantially spherical, fibrous, or polygonal in shape. As used herein, the term "substantially spherical," and grammatical variants thereof, refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped or rod-shaped substances having aspect ratios of greater than about 5 to an unlimited upper limit. The term "polygonal," and grammatical variants thereof, as used herein, refers to shapes having at least two straight sides and angles. Examples of polygonal microparticulates and/or proppant particulates may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

The microparticulates of the present disclosure may have a unit mesh particle size in the range of about 0.1 micrometer (μm) to about 150 μm, encompassing any value and subset therebetween. As used herein, the term "unit mesh particle size" or simply "unit mesh size" refers to a size of an object (e.g., a particulate or aggregate) that is able to pass through a square area having each side thereof equal to the specified numerical value provided herein. Accordingly, the microparticulates may have a unit mesh particle size distribution of about 0.1 μm to about 10 μm, or about 10 μm to about 20 μm, or about 20 μm to about 40 μm, or about 40 μm to about 60 μm, or about 60 μm to about 80 μm, or about 80 μm to about 100 μm, or about 50 μm to about 100 μm, or about 100 μm to about 150 μm, encompassing any value and subset therebetween. The size of the microparticulates may depend on a number of factors including, but not limited to, the type of subterranean formation being treated, the size of the one or more branch fractures formed therein, the shape of the microparticulates selected, and the like, and any combination thereof.

Generally, the microparticulates are included in any treatment fluid of the present disclosure in an amount in the range of about 10% to about 70% by weight of the polar base fluid in the particular treatment fluid, encompassing any value and subset therebetween. For example, the microparticulates may be included in any treatment fluid in an amount of from about 10% to about 20%, or about 20% to about 30%, or about 30% to about 40%, or about 40% to about 50%, or about 50% to about 60%, or about 60% to about 70%, or about 15% to about 65%, or about 20% to about 60%, or about 25% to about 55%, or about 30% to about 50%, or about 35% to about 45%, and the like, encompassing any value and subset therebetween. The amount of microparticulates included in a treatment fluid may depend on a number of factors including, but not limited to, the type of subterranean formation being treated, the size of the branch fractures formed therein, the shape of the microparticulates selected, the particular flocculation polymer selected, and the like, and any combination thereof.

Once flocculated in a treatment fluid with the flocculation polymer, the size of the micro-aggregates are thus larger than any one microparticulate forming the micro-aggregate. In some instances, the size of the micro-aggregates described herein is in the range of from about 50 μm to about 5000 μm, encompassing any value and subset therebetween. For example, the size of the micro-aggregates may be about 50 μm to about 1000 μm, or about 1000 μm to about 2000 μm, or about 2000 μm to about 3000 μm, or about 3000 μm to about 4000 μm, or about 4000 μm to about 5000 μm, or about 500 μm to about 4500 μm, or about 1000 μm to about 4000 μm, or about 1500 μm to about 3500 μm, or about 2000 μm to about 3000 μm, and the like, encompassing any value and subset therebetween. The size of micro-aggregates in a treatment fluid may depend on a number of factors including, but not limited to, the amount and size of microparticulates included, the shape of the microparticulates selected, the particular flocculation polymer selected, and the like, and any combination thereof.

The proppant particulates described herein for propping one or more dominate fractures are larger than the microparticulates. Generally, the proppant particulates have a unit mesh size of about 150 μm to about 3000 μm, encompassing any value and subset therebetween. For example, the proppant particulates may have a unit mesh particle size of about 150 μm to about 200 μm, or about 200 μm to about 760 μm, or about 760 μm to about 1320 μm, or about 1320 μm to about 1880 μm, or about 1880 μm to about 2440 μm, or about 2440 μm to about 3000 μm, or about 600 μm to about 2500 μm, or about 1100 μm to about 2000 μm, encompassing any value and subset therebetween. In some instances, the proppant particulates have a unit mesh size distribution of about 400 µm to about 840 µm, or about 600 µm to about 1200 µm, or about 840 µm to about 1700 µm, or about 1700 µm to about 2400 µm, encompassing any value and subset therebetween. The size of the proppant particulates may depend on a number of factors including, but not limited to, the size and shape of the dominate fracture(s) to be propped, the crush resistance of the proppant particulates, the type of material forming the proppant particulates, and the like, and any combination thereof.

When the proppant particulates are included in a treatment fluid described herein, the proppant particulates may be included in any amount necessary for propping the one or more dominate fractures in a complex fracture network. In some instances, the proppant particulates are included in an amount in the range of about 5% to about 20% by weight of the polar base fluid of the treatment fluid, encompassing any value and subset therebetween. For example, the proppant particulates may be included in an amount of about 5% to about 8%, or about 8% to about 11%, or about 11% to about 14%, or about 14% to about 17%, or about 17% to about 20% by weight of the polar base fluid of the treatment fluid, encompassing any value and subset therebetween. The amount of included proppant particulates may depend on a number of factors including, but not limited to, the size of the proppant particulates, the size of the dominate fracture, and the like, and any combination thereof.

In certain embodiments, one or more of the microparticulates and/or the proppant particulates may be composed of a degradable material. Accordingly, the degradable particulate material may form a part of a micro-aggregate, or may exist individually (either as a microparticulate or a proppant particulate), without departing from the scope of the present disclosure. When included, the degradable particulates can degrade downhole, such as after their placement in a fracture, to increase the conductivity of the fracture, and the porosity of a proppant pack or micro-aggregate.

Any degradable particulate suitable for use in a subterranean formation may be used in accordance with the embodiments described herein. For example, some suitable degradable particulates include, but are not limited to, degradable polymers, dehydrated salts, and any combination thereof. As for degradable polymers, a polymer is considered to be "degradable" herein if the degradation is due to, in situ, a chemical and/or radical process such as hydrolysis, or oxidation.

The degradable polymers may, in some instances be oil-degradable polymers such that during production of hydrocarbons the degradable polymers degrade, thus increasing the conductivity of the fracture for the flow of hydrocarbons. Examples of such oil-degradable polymers may be natural or synthetic polymers including, but not limited to, polyacrylics, polyamides, polyolefins (e.g., polyethylene, polypropylene, polyisobutylene, polystyrene, and the like), and any combination thereof. Examples of additional degradable polymers include, but are not limited to, polysaccharides (e.g., dextran, cellulose, and the like), chitins, chitosans, proteins, aliphatic polyesters, poly(lactides), poly(glycolides), poly(s-caprolactones), poly(hydroxybutyrates), poly(anhydrides), aliphatic or aromatic polycarbonates, poly(orthoesters), poly(amino acids), poly(ethylene oxides), polyphosphazenes, and any combinations thereof.

Dehydrated salt is suitable for use in the present disclosure if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and any combination thereof.

The degradable particulates may have the size and shape of the individual microparticulates and proppant particulates described above, and are typically included in a greater amount when used in conjunction with individual microparticulates and/or proppant particulates as opposed to within a micro-aggregate. In some embodiments, it is preferred that the degradable particulates have a fiber shape. In some embodiments, the degradable particulates are present in a treatment fluid or within a micro-aggregate in an amount in the range of about 1% to about 20% by weight of the proppant particulates in the treatment fluid or the microparticulates in the micro-aggregates, respectively, encompassing any value and subset therebetween. For example, the degradable particulates may be present in a treatment fluid or within a micro-aggregate in an amount of from about 1% to about 4%, or about 4% to about 8%, or about 8% to about 12%, or about 12% to about 16%, or about 16% to about 20% by weight of the proppant particulates in the treatment fluid or in the microparticulates in the micro-aggregates, respectively, encompassing any value and subset therebetween. In some embodiments, the degradable particulates may be present to a lesser extent, in the range of about 1% to about 5% by weight of the microparticulates forming micro-aggregates, encompassing any value and subset therebetween.

The polar base fluids for use in forming the treatment fluids described herein include, but are not limited to, aqueous-based fluids, aqueous-miscible fluids, and any combination thereof. Suitable aqueous-based fluids may include fresh water, saltwater (e.g., water containing one or more salts dissolved therein), brine (e.g., saturated salt water), seawater, wastewater, produced water, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof.

The polar base fluid described herein may be a "slickwater" fluid, meaning a low viscosity fluid (i.e., a viscosity less than that used for fracturing gels) offering friction reduction. Accordingly, the slickwater may contain a low loading of gelling polymer, if needed, as well as friction reducing agents to modify the flow characteristics of the fluid.

A de-aggregating agent may be included in one or more treatment fluids described herein to prevent flocculation of particulates (e.g., microparticulates) with the flocculation polymers, while allowing the flocculation polymers to impart friction reduction to the formation and/or pumping equipment. The de-aggregating agent may be any substance capable of preventing or reducing flocculation of particulates with the flocculation polymers described herein. Examples of suitable de-aggregating agents may include, but are not limited to, an aminosilane, an ammonium salt of polyacrylate, and any combination thereof. In some instances, the de-aggregating agent may be included in the treatment fluid on-the-fly, such that the inclusion of the de-aggregating agent may be turned off or on as the treatment fluid is being introduced into the formation. As used herein, the term "on-the-fly" refers to performing an operation during a subterranean treatment that does not require stopping normal operations.

The de-aggregating agent may be included in an amount necessary to reduce or prevent flocculation of particulates in the presence of the flocculation polymers described herein. In some embodiments, the de-aggregating agent is included in an amount of from about 0.05% to about 5% by volume of the flocculation polymer, encompassing any value and subset therebetween. For example, the de-aggregating agent may be included in an amount of from about 0.05% to about 1%, or about 1% to about 2%, or about 2% to about 3%, or about 3% to about 4%, or about 4% to about 5%, or about 0.05% to about 4%, or about 1% to about 3% by volume of the flocculation polymer, encompassing any value and subset therebetween. The amount of de-aggregating agent included may depend on a number of factors including, but not limited to, the amount and type of flocculation polymer, the amount and type of microparticulates, the desired degree of flocculation reduction or prevention, and the like, and any combination thereof.

In some embodiments, the treatment fluids described herein may further comprise a clay control agent, which may be used to prevent or reduce the migration or swelling of clay particles in reaction to a water-based fluid (e.g., the aqueous and/or aqueous-miscible base fluids described herein). Examples of suitable clay control agents may include, but are not limited to, potassium chloride, sodium chloride, ammonium chloride, tetramethyl ammonium chloride, and any combination thereof. When included, the clay control agent may be in the treatment fluids of the present disclosure in an amount of from about 0.025% to about 1% by volume of the polar base fluid included therein, encompassing any value and subset therebetween. For example, the clay control agent may be in the treatment fluids in an amount of from about 0.025% to about 0.2%, or about 0.2% to about 0.4%, or about 0.4% to about 0.6%, or about 0.6% to about 0.8%, or about 0.8% to about 1%, or about 0.2% to about 0.8%, or about 0.4% to about 0.6% by volume of the polar base fluid included therein, encompassing any value and subset therebetween. The amount of clay control agent included in a treatment fluid may depend on a number of factors including, but not limited to, the type of polar base fluid selected, the characteristics of the subterranean formation (e.g., the amount and type of clay therein), the type of clay control agent selected, the presence of other additives, and the like, and any combination thereof.

In some embodiments, clay stabilization may be achieved using a surfactant, which may be included in the treatment fluids described herein. One or more surfactants may be included in combination with one or more clay control agents, or only one such clay stabilization material may be used, without departing from the scope of the present disclosure. Suitable surfactants may include, but are not limited to, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and any combination thereof. When included, the surfactant may be present in the treatment fluids described herein in an amount of from about 0.025% to about 1% by volume of the polar base fluid included therein, encompassing any value and subset therebetween of the polar base fluid included therein, encompassing any value and subset therebetween. For example, the surfactant may be in the treatment fluids in an amount of from about 0.025% to about 0.2%, or about 0.2% to about 0.4%, or about 0.4% to about 0.6%, or about 0.6% to about 0.8%, or about 0.8% to about 1%, or about 0.2% to about 0.8%, or about 0.4% to about 0.6% by volume of the polar base fluid included therein, encompassing any value and subset therebetween. The amount of surfactant included in a treatment fluid may depend on a number of factors including, but not limited to, the type of polar base fluid selected, the characteristics of the subterranean formation (e.g., the amount and type of clay therein), the type of surfactant selected, the presence of other additives, and the like, and any combination thereof.

The treatment fluids described herein may further comprise one or more additives including, but not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
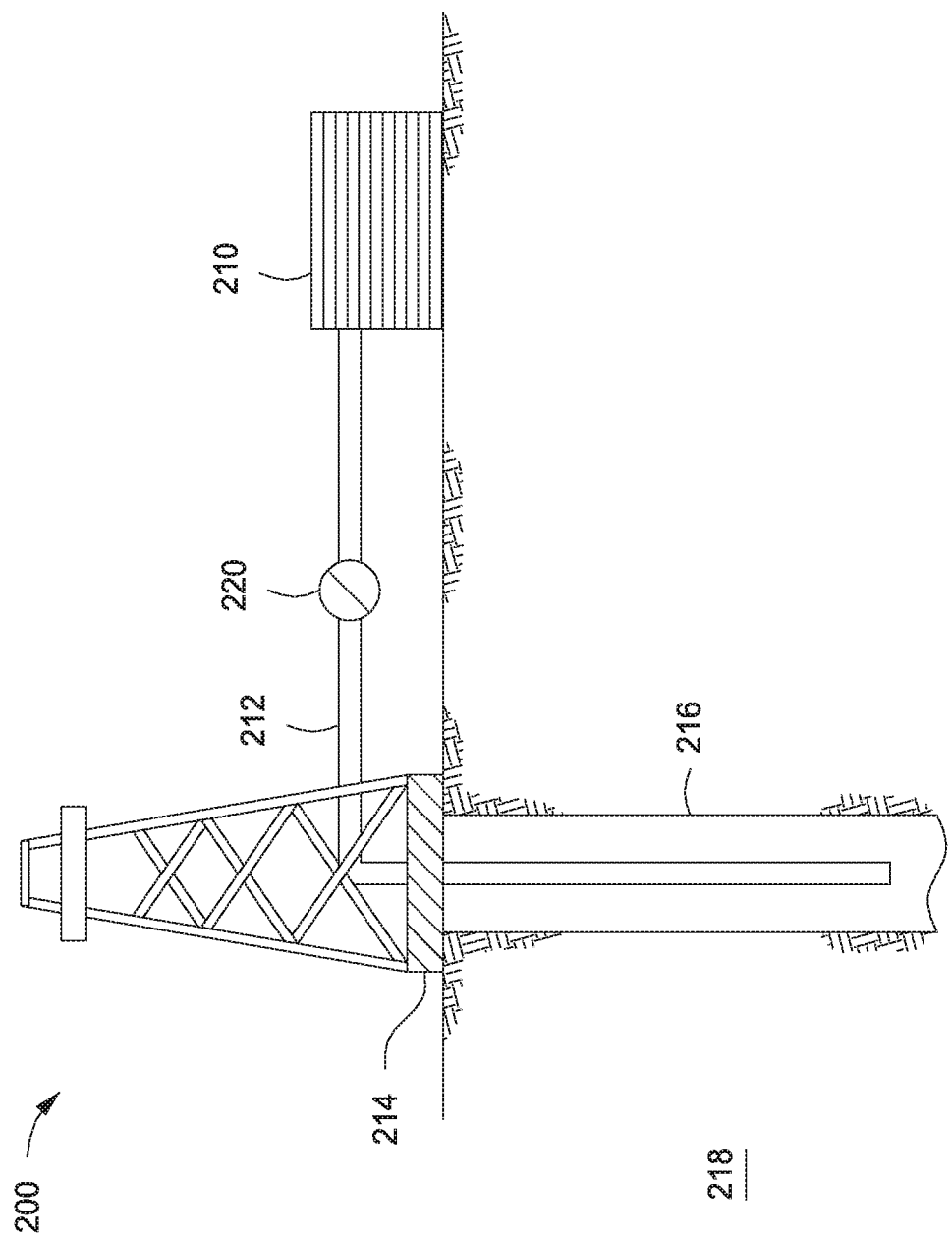
FIG. 2 depicts an embodiment of a system configured for delivering various treatment fluids of the embodiments described herein to a downhole location, according to one or more embodiments of the present disclosure.

FIG. 2 shows an illustrative schematic of a system that can deliver the treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 200 may include mixing tank 210, in which the treatment fluids of the embodiments herein may be formulated. The treatment fluids may be conveyed via line 212 to wellhead 214, where the treatment fluids enter tubular 216, tubular 216 extending from wellhead 214 into subterranean formation 218. Upon being ejected from tubular 216, the treatment fluids may subsequently penetrate into subterranean formation 218. Pump 220 may be configured to raise the pressure of the treatment fluids to a desired degree before introduction into tubular 216. It is to be recognized that system 200 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid or a portion thereof may, in some embodiments, flow back to wellhead 214 and exit subterranean formation 218. In some embodiments, the treatment fluid that has flowed back to wellhead 214 may subsequently be recovered and recirculated to subterranean formation 218, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A: A method comprising: (a) introducing a first treatment fluid into a subterranean formation at a pressure above a fracture gradient of the subterranean formation to create or enhance at least one dominate fracture, wherein the first treatment fluid comprises a first polar base fluid and a first flocculation polymer; (b) introducing a second treatment fluid into the subterranean formation at a pressure above a fracture gradient to create or enhance at least one branch fracture extending from the at least one dominate fracture, wherein the second treatment fluid comprises a second polar base fluid, a second flocculation polymer, and first microparticulates; (c) flocculating the first microparticulates with a flocculation polymer selected from the group consisting of the first flocculation polymer, the second flocculation polymer, and any combination thereof to form micro-aggregates; (d) placing the micro-aggregates in the at least one branch fracture, thereby forming a partial monolayer therein; (e) introducing a third treatment fluid into the subterranean formation at a pressure above the fracture gradient, wherein the third treatment fluid comprises a third polar base fluid, a third flocculation polymer, and a de-aggregating agent; and (f) placing the second microparticulates into the at least one branch fracture.

Embodiment A may have one or more of the following additional elements in any combination:

Element A1: Further comprising between (a) and (b): introducing a fourth treatment fluid into the subterranean formation at a rate and pressure above the fracture, the fourth treatment fluid comprising a fourth polar base fluid and third microparticulates, and flocculating the third microparticulates with the first flocculation polymer, thereby removing at least a portion of the first flocculation polymer from contact with the subterranean formation.

Element A2: Wherein the first flocculation polymer is a polyacrylamide-polyacrylate copolymer and the second first flocculation polymer is a polyacrylamide-polyacrylate copolymer, and each comprise a ratio of about 5% to about 10% by molar % of polyacrylamide to polyacrylate.

Element A3: Wherein the first flocculation polymer is present in the first treatment fluid in a concentration of about 0.01% to about 0.5% by volume of the first polar base fluid.

Element A4: Wherein the second flocculation polymer is present in the second treatment fluid in a concentration of about 0.01% to about 0.5% by volume of the second polar base fluid.

Element A5: Wherein the third flocculation polymer is present in the second treatment fluid in a concentration of about 0.01% to about 0.5% by volume of the third polar base fluid.

Element A6: Wherein the first microparticulates, the second microparticulates, and any combination thereof have a unit mesh size in the range of about 0.1 micrometer to about 150 micrometer.

Element A7: Wherein the first microparticulates are present in a concentration of about 10% to about 70% by weight of the second polar base fluid.

Element A8: Wherein the second microparticulates are present in a concentration of about 10% to about 70% by weight of the third polar base fluid.

Element A9: Further comprising a tubular extending into the subterranean formation through a wellhead, and a pump fluidly coupled to a tubular, wherein a treatment fluid selected from the group consisting of the first treatment fluid, the second treatment fluid, the third treatment fluid, and any combination thereof is introduced into the subterranean formation through the tubular.

By way of non-limiting example, exemplary combinations applicable to A include: A1-A9; A1 and A2; A1 and A3; A1 and A4; A1 and A5; A1 and A6; A1 and A7; A1 and A8; A1 and A9; A2 and A3; A2 and A4; A2 and A5; A2 and A6; A2 and A7; A2 and A8; A2 and A9; A3 and A4; A3 and A5; A3 and A6; A3 and A7; A3 and A8; A3 and A9; A4 and A5; A4 and A6; A4 and A7; A4 and A8; A4 and A9; A5 and A6; A5 and A7; A5 and A8; A5 and A9; A6 and A7; A6 and A8; A6 and A9; A7 and A8; A7 and A9; A8 and A9; A1, A2, A5, and A9; A4, A5, and A8; A3, A5, A6, A7, and A9; and the like, and any combination of A1-A9, without limitation.

Embodiment B: A method comprising: (a) introducing a first treatment fluid into a subterranean formation at a pressure above a fracture gradient of the subterranean formation to create or enhance at least one dominate fracture, wherein the first treatment fluid comprises a first polar base fluid and a first flocculation polymer; (b) introducing a second treatment fluid into the subterranean formation at a pressure above a fracture gradient to create or enhance at least one branch fracture extending from the at least one dominate fracture, wherein the second treatment fluid comprises a second polar base fluid, a second flocculation polymer, and first microparticulates; (c) flocculating the first microparticulates with a flocculation polymer selected from the group consisting of the first flocculation polymer, the second flocculation polymer, and any combination thereof to form micro-aggregates; (d) placing the micro-aggregates in the at least one branch fracture, thereby forming a partial monolayer therein; (e) introducing a third treatment fluid into the subterranean formation at a pressure above the fracture gradient, wherein the third treatment fluid comprises a third polar base fluid, a third flocculation polymer, second microparticulates, and a de-aggregating agent; (f) placing the second microparticulates into the at least one branch fracture; and (g) introducing a fourth treatment fluid into the subterranean formation at a pressure above the fracture gradient, wherein the fourth treatment fluid comprises a fourth polar base fluid and proppant particulates; and (h) placing the proppant particulates into the at least one dominate fracture.

Embodiment B may have one or more of the following additional elements in any combination:

Element B1: Further comprising between (a) and (b): introducing a fifth treatment fluid into the subterranean formation at a rate and pressure above the fracture, wherein the fifth treatment fluid comprises a fifth polar base fluid and third microparticulates, and flocculating the third microparticulates with the first flocculation polymer, thereby removing at least a portion of the first flocculation polymer from contact with the subterranean formation.

Element B2: Wherein the first flocculation polymer is a polyacrylamide-polyacrylate copolymer, the second first flocculation polymer is a polyacrylamide-polyacrylate copolymer, and the third flocculation polymer is a polyacrylamide-polyacrylate copolymer, and each comprise a ratio of about 5% to about 10% by molar % of polyacrylamide to polyacrylate.

Element B3: Wherein the first flocculation polymer is present in the first treatment fluid in a concentration of about 0.01% to about 0.5% by volume of the first polar base fluid.

Element B4: Wherein the second flocculation polymer is present in the second treatment fluid in a concentration of about 0.01% to about 0.5% by volume of the second polar base fluid.

Element B5: Wherein the third flocculation polymer is present in the third treatment fluid in a concentration of about 0.01% to about 5% by volume of the third polar base fluid.

Element B6: Wherein the first microparticulates, the second microparticulates, and any combination thereof have a unit mesh size in the range of about 0.1 micrometer to about 150 micrometer.

Element B7: Wherein the de-aggregating agent is present in the third treatment fluid in a concentration of about 0.05% to about 5% by volume of the third flocculation polymer.

Element B8: Further comprising metering the proppant particulates in the fourth treatment fluid as the fourth treatment fluid is introduced into the subterranean formation, and wherein the proppant particulates gradually increase in size.

Element B9: Further comprising a tubular extending into the subterranean formation through a wellhead, and a pump fluidly coupled to a tubular, wherein a treatment fluid selected from the group consisting of the first treatment fluid, the second treatment fluid, the third treatment fluid, the fourth treatment fluid, and any combination thereof is introduced into the subterranean formation through the tubular.

By way of non-limiting example, exemplary combinations applicable to B include: B1-B9; B1 and B2; B1 and B3; B1 and B4; B1 and B5; B1 and B6; B1 and B7; B1 and B8; B1 and B9; B2 and B3; B2 and B4; B2 and B5; B2 and B6; B2 and B7; B2 and B8; B2 and B9; B3 and B4; B3 and B5; B3 and B6; B3 and B7; B3 and B8; B3 and B9; B4 and B5; B4 and B6; B4 and B7; B4 and B8; B4 and B9; B5 and B6; B5 and B7; B5 and B8; B5 and B9; B6 and B7; B6 and B8; B6 and B9; B7 and B8; B7 and B9; B8 and B9; B1, B3, B6, and B9; B2, B4, and B7; B3, B5, B7, B8, and B9; and the like, and any combination of B1-B9, without limitation.

To facilitate a better understanding of the embodiments of the present disclosure, the following examples of preferred or representative embodiments are given. In no way should the following examples be read to limit, or to define, the scope of the present disclosure.

Example 1

Figure 3:
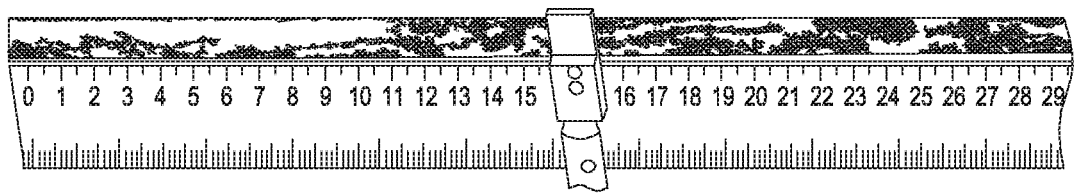
FIG. 3 depicts the formation of micro-aggregates due to flocculation of microparticulates with a flocculation polymer, according to one or more embodiments of the present disclosure.

In this example, the formation of micro-aggregates according to one or more embodiments described herein was evaluated. A treatment fluid was prepared with 1 gallon per thousand gallons ("gpt") of a flocculation polymer comprising a polyacrylamide-polyacrylate copolymer with an anionic charge, 0.1 pound per gallon ("lb/gal") of silica/alumia sand microparticulates having unit mesh sizes between 1 μm and 150 μm, an aqueous base fluid formed of tap water, and 14 pound per 1000 gallons ("lb/Mgal") xanthan gelling agent. The polyacrylamide-polyacrylate copolymer comprises 5% acrylate by molar %. The treatment fluid was flowed through a mini-slot flow device having dimensions of 1 millimeter ("mm")×10 mm×600 mm, as shown in FIG. 3. As shown in FIG. 3, micro-aggregates are formed due to flocculation of the microparticulates with the flocculation polymer.

Example 2

In this example, the ability of the embodiments described herein to clean up the flocculation polymer was evaluated.

That is, it was used to demonstrate the amount of flocculation polymers being sequestered from the polar base fluid in the treatment fluid (i.e., coming out of solution) when exposed to microparticulates. A control fluid was prepared using 1 gpt of flocculation polymer comprising a polyacrylamide-polyacrylate copolymer in a tap water aqueous base fluid, with no microparticulates. The polyacrylamide-polyacrylate copolymer comprises 5% acrylate by molar %. A treatment fluid was prepared using 1 gpt of the same flocculation polymer and 1% by weight of a microparticulate slurry. The microparticulate slurry was composed of 0.10 pound per gallon ("ppg") of 0.1-20 μm microparticulates in tap water. The treatment fluid was visually observed and the formation of micro-aggregates was seen, where the micro-aggregates are formed by flocculation of the microparticulates with the flocculation polymer, thus resulting in the sequestration of the flocculation polymer from the aqueous base fluid. The supernatant of the treatment fluid was then decanted and analyzed to determine the concentration of the flocculation polymer therein, and was compared to the control. The concentration was determined using thermogravimetric analysis at ambient temperature, under static conditions after 5 minutes of mixing and the viscosity was determined using a FANN® Model 35 Viscometer at 300 rpm and room temperature. Two samples were evaluated to confirm repeatability. The results are shown in Table 1 below.

TABLE 1

|  | Control Fluid (no microparticulates) | Treatment Fluid (with microparticulates) |
|---|---|---|
| Concentration of Flocculation Polymer | 1 gpt | Not Determined (ND) |
| Viscosity | ~5 centipoise | ~3-4 centipoise |
| TGA Concentration of Flocculation polymer, Test 1 | 0.066% | 0.028% |
| TGA Concentration of Flocculation polymer, Test 2 | 0.058% | 0.033% |

As shown in Table 1, exposure of the flocculation polymer to the microparticulates resulted in a significant decrease in the concentration of the flocculation polymer due to the flocculation of the microparticulates to form the micro-aggregates. Accordingly, the combination of the micro-aggregates and the flocculation polymer may be used to effectively "clean up" the flocculation polymer. The reduction in viscosity further confirms the "clean up" property.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:
1. A method comprising:
(a) introducing a first treatment fluid into a subterranean formation at a pressure above a fracture gradient of the subterranean formation to create or enhance at least one dominate fracture, wherein the first treatment fluid comprises a first polar base fluid and a first flocculation polymer;
(b) introducing a second treatment fluid into the subterranean formation at a pressure above a fracture gradient to create or enhance at least one branch fracture extending from the at least one dominate fracture, wherein the second treatment fluid comprises a second polar base fluid, a second flocculation polymer, and first microparticulates;
(c) flocculating the first microparticulates with a flocculation polymer selected from the group consisting of the first flocculation polymer, the second flocculation polymer, and any combination thereof to form micro-aggregates;
(d) placing the micro-aggregates in the at least one branch fracture, thereby forming a partial monolayer therein;
(e) introducing a third treatment fluid into the subterranean formation at a pressure above the fracture gradient, wherein the third treatment fluid comprises a third polar base fluid, a third flocculation polymer, and a de-aggregating agent; and
(f) closing the facture, wherein during fracture closure a second microparticulates leaks off into the at least one branch fracture.

2. The method of claim 1, further comprising between (a) and (b):
introducing a fourth treatment fluid into the subterranean formation at a rate and pressure above the fracture, the fourth treatment fluid comprising a fourth polar base fluid and third microparticulates, and
flocculating the third microparticulates with the first flocculation polymer, thereby removing at least a portion of the first flocculation polymer from contact with the subterranean formation.

3. The method of claim 1, wherein the first flocculation polymer is a polyacrylamide-polyacrylate copolymer and the second flocculation polymer is a polyacrylamide-polyacrylate copolymer, and each comprise a ratio of about 5% to about 10% by molar % of polyacrylamide to polyacrylate.

4. The method of claim 1, wherein the first flocculation polymer is present in the first treatment fluid in a concentration of about 0.01% to about 0.5% by volume of the first polar base fluid.

5. The method of claim 1, wherein the second flocculation polymer is present in the second treatment fluid in a concentration of about 0.01% to about 0.5% by volume of the second polar base fluid.

6. The method of claim 1, wherein the third flocculation polymer is present in the third treatment fluid in a concentration of about 0.01% to about 0.5% by volume of the third polar base fluid.

7. The method of claim 1, wherein the first microparticulates, the second microparticulates, and any combination thereof have a unit mesh size in the range of about 0.1 micrometer to about 150 micrometer.

8. The method of claim 1, wherein the first microparticulates are present in a concentration of about 10% to about 70% by weight of the second polar base fluid.

9. The method of claim 1, wherein the second microparticulates are present in a concentration of about 10% to about 70% by weight of the third polar base fluid.

10. The method of claim 1, further comprising a tubular extending into the subterranean formation through a wellhead, and a pump fluidly coupled to a tubular, wherein a treatment fluid selected from the group consisting of the first treatment fluid, the second treatment fluid, the third treatment fluid, and any combination thereof is introduced into the subterranean formation through the tubular.

11. A method comprising:
(a) introducing a first treatment fluid into a subterranean formation at a pressure above a fracture gradient of the subterranean formation to create or enhance at least one dominate fracture, wherein the first treatment fluid comprises a first polar base fluid and a first flocculation polymer;
(b) introducing a second treatment fluid into the subterranean formation at a pressure above a fracture gradient to create or enhance at least one branch fracture extending from the at least one dominate fracture, wherein the second treatment fluid comprises a second polar base fluid, a second flocculation polymer, and first microparticulates;
(c) flocculating the first microparticulates with a flocculation polymer selected from the group consisting of the first flocculation polymer, the second flocculation polymer, and any combination thereof to form micro-aggregates;
(d) placing the micro-aggregates in the at least one branch fracture, thereby forming a partial monolayer therein;
(e) introducing a third treatment fluid into the subterranean formation at a pressure above the fracture gradient, wherein the third treatment fluid comprises a third polar base fluid, a third flocculation polymer, second microparticulates, and a de-aggregating agent;
(f) placing the second microparticulates into the at least one branch fracture; and
(g) introducing a fourth treatment fluid into the subterranean formation at a pressure above the fracture gradient, wherein the fourth treatment fluid comprises a fourth polar base fluid and proppant particulates; and
(h) placing the proppant particulates into the at least one dominate fracture; and
(i) closing the facture, wherein during fracture closure the second microparticulates leaks off into the at least one branch fracture.

12. The method of claim 11, further comprising between (a) and (b):
introducing a fifth treatment fluid into the subterranean formation at a rate and pressure above the fracture, wherein the fifth treatment fluid comprises a fifth polar base fluid and third microparticulates, and
flocculating the third microparticulates with the first flocculation polymer, thereby removing at least a portion of the first flocculation polymer from contact with the subterranean formation.

13. The method of claim 11, wherein the first flocculation polymer is a polyacrylamide-polyacrylate copolymer, the second flocculation polymer is a polyacrylamide-polyacrylate copolymer, and the third flocculation polymer is a polyacrylamide-polyacrylate copolymer, and each comprise a ratio of about 5% to about 10% by molar % of polyacrylamide to polyacrylate.

14. The method of claim 11, wherein the first flocculation polymer is present in the first treatment fluid in a concentration of about 0.01% to about 0.5% by volume of the first polar base fluid.

15. The method of claim 11, wherein the second flocculation polymer is present in the second treatment fluid in a concentration of about 0.01% to about 0.5% by volume of the second polar base fluid.

16. The method of claim 11, wherein the third flocculation polymer is present in the third treatment fluid in a concentration of about 0.01% to about 5% by volume of the third polar base fluid.

17. The method of claim 11, wherein the first microparticulates, the second microparticulates, and any combination thereof have a unit mesh size in the range of about 0.1 micrometer to about 150 micrometer.

18. The method of claim 11, wherein the de-aggregating agent is present in the third treatment fluid in a concentration of about 0.05% to about 5% by volume of the third flocculation polymer.

19. The method of claim 11, further comprising metering the proppant particulates in the fourth treatment fluid as the fourth treatment fluid is introduced into the subterranean formation, and wherein the proppant particulates gradually increase in size.

20. The method of claim 11, further comprising a tubular extending into the subterranean formation through a wellhead, and a pump fluidly coupled to a tubular, wherein a treatment fluid selected from the group consisting of the first treatment fluid, the second treatment fluid, the third treatment fluid, the fourth treatment fluid, and any combination thereof is introduced into the subterranean formation through the tubular.

* * * * *